(12) United States Patent
Ishidoshiro et al.

(10) Patent No.: US 7,366,474 B2
(45) Date of Patent: **\*Apr. 29, 2008**

(54) TECHNIQUE OF DETECTING THE PROPAGATION ENVIRONMENT OF RADIO WAVE

(75) Inventors: Takashi Ishidoshiro, Nagoya (JP); Yoshiiku Sonobe, Nagoya (JP)

(73) Assignee: Buffalo Inc., Nagoya (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 11/599,041

(22) Filed: Nov. 13, 2006

(65) Prior Publication Data

US 2007/0060068 A1    Mar. 15, 2007

Related U.S. Application Data

(63) Continuation of application No. 10/346,731, filed on Jan. 17, 2003, now Pat. No. 7,162,205.

(30) Foreign Application Priority Data

Nov. 26, 2002    (JP) .............................. 2002-342609

(51) Int. Cl.
H04B 17/00   (2006.01)
H04Q 7/20   (2006.01)

(52) U.S. Cl. ................ 455/67.11; 455/115.1; 455/423

(58) Field of Classification Search ............. 455/67.11, 455/115.1, 423, 67.14, 67.15, 67.16, 63.1, 455/73, 553.1, 566, 115.2, 130
See application file for complete search history.

(56) References Cited

U.S. PATENT DOCUMENTS 5,423,071 A *   6/1995   Hanninen ................ 455/67.13
5,740,531 A *   4/1998   Okada ........................ 455/403
6,347,230 B2 *   2/2002   Koshima et al. ............. 455/457
6,839,558 B2 *   1/2005   Namura et al. .............. 455/423
2002/0142744 A1   10/2002   Okanoue et al.

FOREIGN PATENT DOCUMENTS

| JP | 6-37762 | 2/1994 |
| JP | 2001-16057 | 1/2001 |
| JP | 2002-034077 | 1/2002 |

OTHER PUBLICATIONS

European Search Report dated Dec. 5, 2005 from corresponding European Application No. 03252825.9-2411.
Japanese Office Action dated Mar. 15, 2005 from corresponding Japanese Application No. 2002-342609.

* cited by examiner

*Primary Examiner*—Tony T. Nguyen
(74) *Attorney, Agent, or Firm*—Beyer Law Group LLP

(57) ABSTRACT

In a detector device 10 of the invention, a wave detection module 20 receives and detects radio wave in a predetermined frequency band, which is used by a target wireless communication device for telecommunication. An extraction module 30 extracts a pattern representing a time-series variation in presence or absence of the detected radio wave. An identification module 40 compares the extracted pattern with inherent patterns of radio wave transmitted from plural devices, which use the radio wave in the predetermined frequency band and include the target wireless communication device, and thereby identifies the propagation environment of the radio wave transmitted from the target wireless communication device. A display module 50 displays a result of the identification by changing lighting statuses of LEDs. When smooth telecommunication of a wireless communication device is interrupted, this arrangement of the invention desirably identifies the reason of the interrupted communication.

8 Claims, 9 Drawing Sheets

Fig.6

| PROPAGATION ENVIRONMENT | LED1 | LED2 | LED3 |
|---|---|---|---|
| WIRELESS LAN RADIO WAVE ABSENT | OFF | OFF | OFF |
| WIRELESS LAN COMMUNICABLE | FLASH ON-OFF | OFF | OFF |
| MICROWAVE OVEN-CAUSING INCOMMUNICABLE | FLASH ON-OFF | FLASH ON-OFF | OFF |
| HAM RADIO DEVICE-CAUSING INCOMMUNICABLE | FLASH ON-OFF | OFF | FLASH ON-OFF |

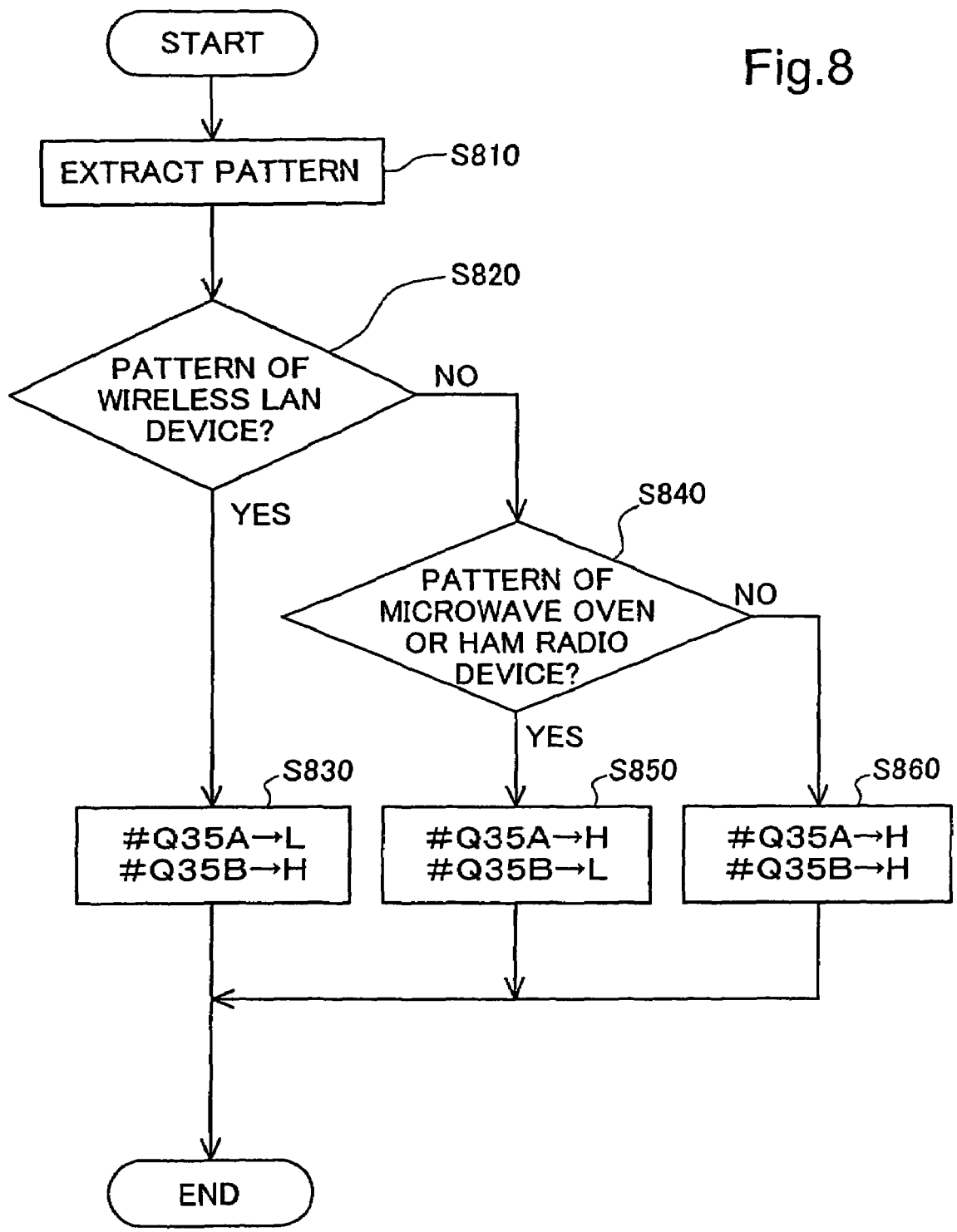

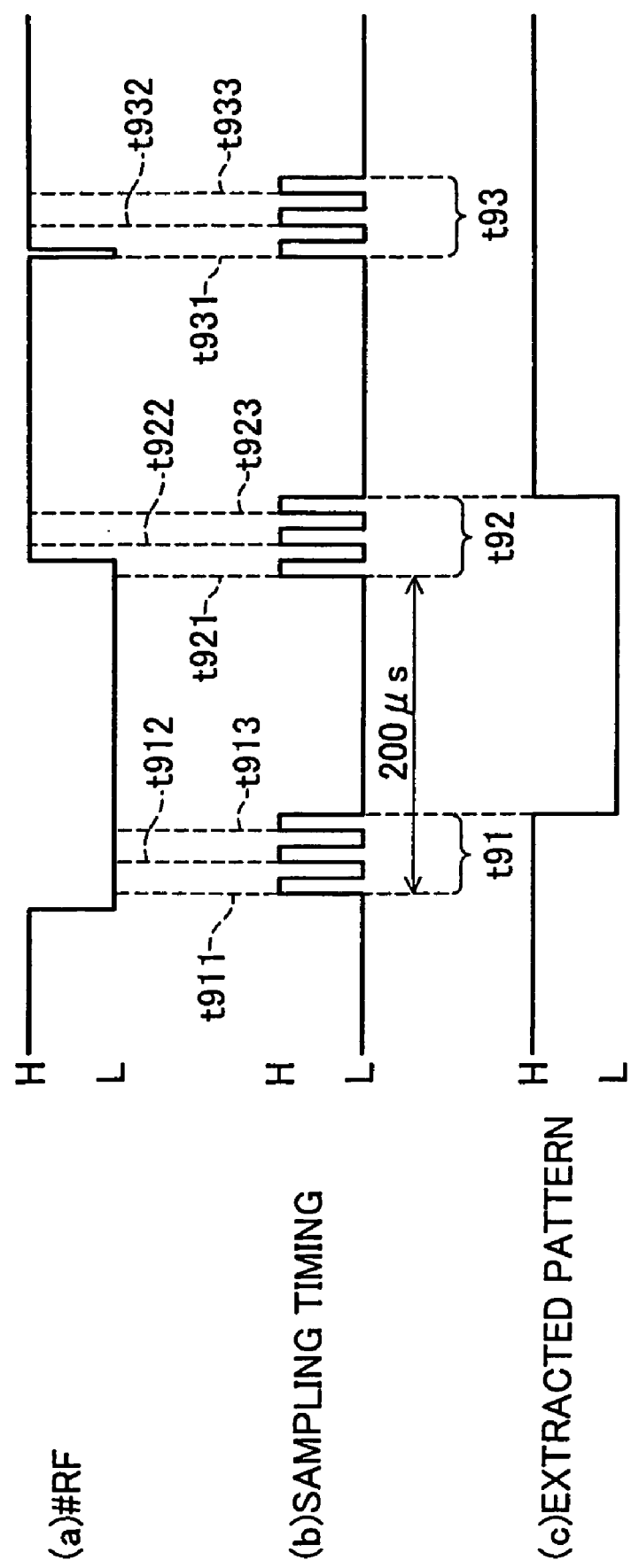

TECHNIQUE OF DETECTING THE PROPAGATION ENVIRONMENT OF RADIO WAVE

CROSS-REFERENCE TO RELATED APPLICATIONS

This application is a continuation of U.S. patent application Ser. No. 10/346,731 entitled "TECHNIQUE OF DETECTING THE PROPAGATION ENVIRONMENT OF RADIO WAVE" filed Jan. 17, 2003, now U.S. Pat. No. 7,162,205 which is incorporated herein by reference for all purposes.

BACKGROUND OF THE INVENTION

1. Field of the Invention

The present invention relates to a technique of detecting the propagation environment of radio wave used for wireless telecommunications by a wireless communication device.

2. Description of the Related Art

Wireless local area networks (hereafter may be referred to as wireless LANs) and cell phone systems are typical examples of wireless telecommunication that utilizes radio wave for transmission of information. A known technique applied to a terminal device of telecommunication detects the propagation status of radio wave used for telecommunication, based on the intensity of an electric field of radio wave signals between a base station and a terminal device.

The terminal device that detects the propagation status of radio wave used for telecommunication based on the intensity of the electric field of radio wave signals between the base station and a terminal device is disclosed, for example, in JAPANESE PATENT LAID-OPEN GAZETTE No. 2002-34077.

In the case of failed telecommunication by the terminal device, however, this prior art technique of detecting the propagation status of radio wave based on the intensity of an electric field can not identify the reason of the failed communication, due to the absence of the radio wave signal for wireless communication or due to the effects of competing radio wave emitted from another device, such as a ham radio device or a microwave oven.

SUMMARY OF THE INVENTION

The object of the present invention is thus to provide a technique of detecting a propagation environment of radio wave that, in the case of interruption of smooth telecommunication of a terminal device via a wireless LAN, identifies the reason of the interrupted communication.

In order to attain at least part of the above and the other related objects, the present invention is directed to a detector device that detects a propagation environment of radio wave in a predetermined frequency band, which is used by a target wireless communication device for telecommunication. The detector device includes: a wave detection module that receives and detects the radio wave in the predetermined frequency band; an extraction module that extracts a pattern representing a time-series variation in presence or absence of the detected radio wave; an identification module that compares the extracted pattern with inherent patterns of radio wave transmitted from plural devices, which use the radio wave in the predetermined frequency band and include the target wireless communication device, and thereby identifies the propagation environment of the radio wave transmitted from the target wireless communication device; and a display module that displays a result of the identification.

There is a method corresponding to the above detector device. The present invention is accordingly directed to a method of detecting a propagation environment of radio wave in a predetermined frequency band, which is used by a target wireless communication device for telecommunication. The method includes the steps of: receiving and detecting the radio wave in the predetermined frequency band; extracting a pattern representing a time-series variation in presence or absence of the detected radio wave; and comparing the extracted pattern with inherent patterns of radio wave transmitted from plural devices, which use the radio wave in the predetermined frequency band and include the target wireless communication device, and thereby identifying the propagation environment of the radio wave transmitted from the target wireless communication device.

The detector device or the corresponding method of the invention extracts the pattern representing a time-series variation in presence or absence of the detected radio wave, compares the extracted pattern with inherent patterns of radio wave transmitted from plural devices, which use the radio wave in the predetermined frequency band and include the target wireless communication device, and thereby identifies the propagation environment of the radio wave. When smooth telecommunication by the target wireless communication device is interrupted, this arrangement of the invention effectively identifies the reason of the interrupted communication.

In one preferable application of the detector device, in the case of coincidence of the extracted pattern with an inherent pattern output from the target wireless communication device, the identification module determines that the identified propagation environment is a communicable state by the target wireless communication device.

This application identifies the 'communicable' propagation environment, in which the radio wave used by the target wireless communication device is reached and no competing radio wave is present.

In another preferable application of the detector device, in the case of no extraction of the pattern representing the time-series variation in presence or absence of the detected radio wave, the identification module determines that the identified propagation environment is an incommunicable state by the target wireless communication device because of absence of the radio wave transmitted from the target wireless communication device.

This application identifies the 'incommunicable' propagation environment that is not due to the presence of competing radio wave but due to the unreached and thereby absent radio wave, which may be ascribed to the distance from the target wireless communication device or the influence of buildings or other obstacles.

In one preferable embodiment of the detector device of the invention, the plural devices include at least one foreign wireless communication device, which is different from the target wireless communication device. In the case of coincidence of the extracted pattern with an inherent pattern output from the foreign wireless communication device, the identification module determines that the identified propagation environment is an incommunicable state by the target wireless communication device because of competition with the radio wave transmitted from the foreign wireless communication device. The at least one foreign wireless communication device may include a ham radio device.

This application identifies the 'incommunicable' propagation environment that is not due to absence of the radio wave but due to competition with the radio wave transmitted from a foreign wireless communication device, such as a ham radio device.

In another preferable embodiment of the detector device of the invention, the plural devices include at least one electronic device that emits non-required radiant noise in the predetermined frequency band. In the case of coincidence of the extracted pattern with an inherent pattern output from the electronic device, the identification module determines that the identified propagation environment is an incommunicable state by the target wireless communication device because of competition with the non-required radiant noise emitted from the electronic device. The at least one electronic device may include a microwave oven.

This application identifies the 'incommunicable' propagation environment that is not due to absence of the radio wave but due to competition with the non-required radiant noise emitted from an electronic device, such as a microwave oven.

The target wireless communication device may be a wireless local area network device. The detector device of the invention is applicable to detect the propagation environment of the radio wave used for telecommunication in a variety of indoor and outdoor conditions to which the wireless local area network device is exposed.

The technique of the present invention is also applicable to a terminal device of a wireless local area network. The present invention is accordingly directed to a terminal device that is connected via radio wave in a predetermined frequency band to a wireless local area network provided by a base station. The terminal device includes: a wave detection module that receives and detects the radio wave in the predetermined frequency band; an extraction module that extracts a pattern representing a time-series variation in presence or absence of the detected radio wave; an identification module that compares the extracted pattern with inherent patterns of radio wave transmitted from plural devices, which use the radio wave in the predetermined frequency band and include the base station, and thereby identifies the propagation environment of the radio wave transmitted from the base station; and a display module that displays a result of the identification.

The terminal device of the invention extracts the pattern representing a time-series variation in presence or absence of the detected radio wave, compares the extracted pattern with inherent patterns of radio wave transmitted from plural devices, which use the radio wave in the predetermined frequency band and include the base station, and thereby identifies the propagation environment of the radio wave. When smooth telecommunication by the terminal device is interrupted, this arrangement of the invention effectively identifies the reason of the interrupted communication. This arrangement enables some constituents of the device to be shared for different purposes. For example, one radio wave receiving structure may be commonly used for detection of the propagation environment and for telecommunication.

The above and other objects, features, aspects, and advantages of the present invention will become more apparent from the following detailed description of the preferred embodiments with the accompanying drawings.

BRIEF DESCRIPTION OF THE DRAWINGS

FIG. 6 shows lighting statuses of light-emitting diodes LED1, LED2, and LED3 of a display module in the first embodiment of the invention;

FIG. 8 is a flowchart showing a processing routine executed by a status detection circuit in the second embodiment of the invention; and FIG. 9 is a timing chart showing a pattern extraction process of the status detection circuit in the second embodiment of the invention.

DESCRIPTION OF THE PREFERRED EMBODIMENTS

A detector device of detecting the propagation environment of radio wave in a wireless LAN is discussed below as a typical example of the detector device, to which the technique of the present invention is applied.

Figure 1:
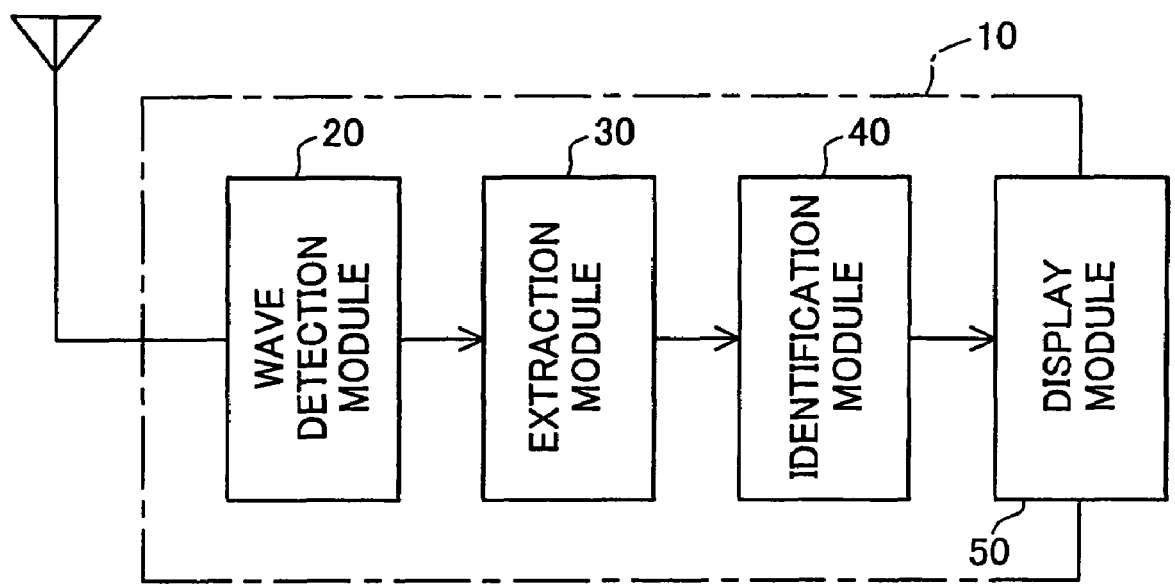
FIG. 1 is a functional block diagram showing the functions of a detector device in a first embodiment of the invention.

FIG. 1 is a functional block diagram showing the functions of a detector device 10 in a first embodiment of the invention. The detector device 10 detects the propagation environment of radio wave used for telecommunications by a wireless LAN device, which is one of wireless communication devices. The detector device 10 has a wave detection module 20 that receives and detects radio wave in a predetermined frequency band used for telecommunications by the wireless LAN device, an extraction module 30 that binarizes a variation in intensity of the detected radio wave and extracts the binary data as a time series pattern, an identification module 40 that checks the extracted pattern and identifies the propagation environment of radio wave transmitted from the wireless LAN device, and a display module 50 that displays results of the identification. The detector device 10 of the embodiment detects the propagation environment of a wireless LAN in a frequency band of 2.4 GHz, which is conformity with the standard 'IEEE 802.11b'. The wave detection module 20 receives and detects the radio wave in the frequency band of 2.4 GHz.

The identification module 40 uses the pattern extracted by the extraction module 30 to identify the type of the device transmitting the radio wave in the frequency band of 2.4 GHz. There are diverse devices transmitting the radio wave in this frequency band, for example, microwave ovens, ham radio devices, in addition to wireless LAN devices. These diverse devices respectively have inherent patterns with regard to the field intensity of the transmitted radio wave in the frequency band of 2.4 GHz. The identification module 40 compares the extracted pattern with the inherent patterns, so as to identify the propagation environment of the radio wave in the frequency band of 2.4 GHz. These diverse devices other than the wireless LAN device transmit the radio wave that interferes with telecommunication by the wireless LAN device. Typical examples of such devices that transmit the radio wave competing with the radio wave of the wireless LAN device in the frequency band of 2.4 GHz are a microwave oven and a ham radio device. The identification module 40 of the embodiment is accordingly constructed to compare the extracted pattern with the inherent patterns of a wireless LAN device, a microwave oven, and a ham radio device that transmit the radio wave in the frequency band of 2.4 GHz. The circuit structure of the identification module 40 will be discussed later in detail.

The identification module 40 checks the inherent pattern of the radio wave in the frequency band of 2.4 GHz transmitted from a wireless LAN device. A base station, which is a wireless LAN device in conformity with the standard 'IEEE 802.11b', transmits a beacon at regular intervals for telecommunication with wireless terminal devices. The beacon is a signal having a period of approximately 100 milliseconds (hereafter expressed as ms) and a pulse width of about 700 to 800 microseconds (hereafter expressed as μs). The identification module 40 assumes a pattern having the period of approximately 100 ms and the pulse width of about 700 to 800 (m as the inherent pattern of the radio wave transmitted from the wireless LAN device and compares the extracted pattern with this inherent pattern.

The identification module 40 also checks the inherent pattern of the radio wave in the frequency band of 2.4 GHz transmitted from a microwave oven. The microwave oven directly heats food with the radio wave in the frequency band of 2.4 GHz generated by an internal magnetron. Non-required radiant noise emitted from the microwave oven may compete with the radio wave used for telecommunication of the wireless LAN device in the frequency band to interfere with the smooth telecommunication of the wireless LAN device. The non-required radiant noise is a continuous pulse signal having a period of about 7 to 22 ms. The identification module 40 assumes a pattern of a continuous pulse signal having the period of about 7 to 22 ms as the inherent pattern of the radio wave transmitted from the microwave oven and compares the extracted pattern with this inherent pattern.

The identification module 40 further checks the inherent pattern of the radio wave in the frequency band of 2.4 GHz transmitted from a ham radio device. The communication signal of the ham radio device, which is another wireless communication device different from the wireless LAN device, has a greater pulse width (not less than approximately 500 ms), compared with the beacon of the wireless LAN device. The identification module 40 assumes a pattern having the pulse width of not less than approximately 500 ms as the inherent pattern of the radio wave transmitted from the ham radio device and compares the extracted pattern with this inherent pattern.

Figure 2:
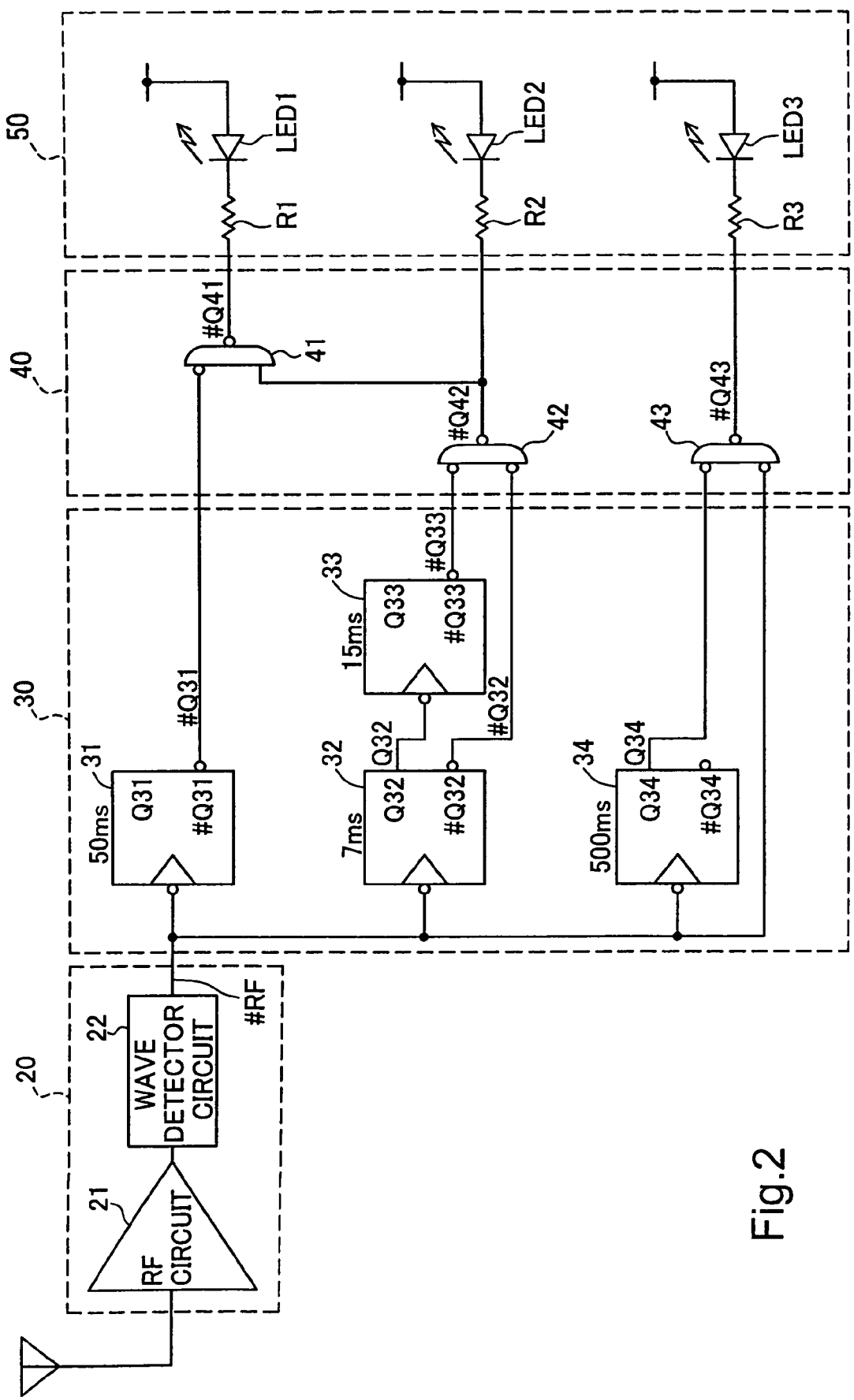
FIG. 2 is a circuit diagram showing the circuit structure of the detector device in the first embodiment of the invention.

The detector device 10 works as discussed below. FIG. 2 is a circuit diagram showing the circuit structure of the detector device 10 in the first embodiment of the invention. The wave detection module 20 has an RF circuit 21 that amplifies the received signal in the frequency band of 2.4 GHz, and a wave detector circuit 22 that detects the amplified signal in the frequency band of 2.4 GHz. The wave detector circuit 22 sets a detection output #RF to a high level H in the case of no detection of the signal in the frequency band of 2.4 GHz and to a low level L in the case of detection of the signal in the frequency band of 2.4 GHz.

The extraction module 30 has four one-shot multi-vibrators 31, 32, 33, and 34. The one-shot multi-vibrators 31, 32, 33, and 34 respectively output pulse signals having the pulse width of 50 ms, 7 ms, 15 ms, and 500 ms in response to a falling edge of an input signal. The one-shot multi-vibrators 31 and 34 are retriggerable and update the output of the pulse signal in response to every input of a falling edge. In the case of re-input of a falling edge prior to the end of the preset pulse signal, the output of the pulse signal is reactivated at the time of re-input and keeps active for a predetermined time period. The one-shot multi-vibrators 31 through 34 respectively have positive logic output terminals Q31, Q32, Q33, and Q34 and negative logic output terminals #Q31, #Q32, #Q33, and #Q34 as the output terminals of the pulse signal. The identification module 40 combines positive and negative logic outputs of the four one-shot multi-vibrators 31 through 34 included in the extraction module 30 to identify the device outputting the radio wave in the frequency band of 2.4 GHz. The identification module 40 has a logic gate 41 that receives a positive logic and a negative logic as two inputs, calculates a logical product of the two inputs, and outputs the calculated logical product as a negative logic. The identification module 40 also has two logic gates 42 and 43, each of which receives negative logics as two inputs, calculates a logical product of the two inputs, and outputs the calculated logical product as a negative logic. The display module 50 has three light-emitting diodes LED1, LED2, and LED3 and three resistors R1, R2, and R3.

In the specification hereof, the terminal name and the signal name are expressed by an identical symbol. The mark '#' prefixed to the terminal name (signal name) represents a negative logic (active low). The level 'H' and the level 'L' respectively mean a level '1' and a level '0' out of the two levels of a binary signal.

The detection output #RF of the wave detector circuit 22 is connected to the input terminals of the one-shot multi-vibrators 31, 32, and 34 in the extraction module 30 and one of the two input terminals of the logic gate 43 in the identification module 40. The positive logic output Q34 of the one-shot multi-vibrator 34 in the extraction module 30 is connected to the other of the two input terminals of the logic gate 43 in the identification module 40.

The positive logic output Q32 of the one-shot multi-vibrator 32 in the extraction module 30 is connected to the input terminal of the subsequent one-shot multi-vibrator 33. The negative logic output #Q32 of the one-shot multi-vibrator 32 and the negative logic output #Q33 of the one-shot multi-vibrator 33 are respectively connected to the two input terminals of the logic gate 42 in the identification module 40.

The negative logic output #Q31 of the one-shot multi-vibrator 31 is connected to the negative logic input terminal of the logic gate 41 in the identification module 40. The positive logic input terminal of the logic gate 41 receives the negative logic output #42 of the logic gate 42. The logic gates 41 through 43 are linked with the light-emitting diodes LED1 through LED3 in the display module 50 to light up or light off the light-emitting diodes LED1 through LED3.

Positive power lines are linked to the anodes of the light-emitting diodes LED1, LED2, and LED3. The cathodes of the light-emitting diodes LED1, LED2, and LED3 are respectively connected with the negative logic output terminals #Q41, #Q42, and #Q43 of the logic gates 41, 42, and 43 via the resistors R1, R2, and R3 for preventing over-currents. When the output #Q41 of the logic gate 41 is at the level L, electric current runs through the light-emitting diode LED1, which is accordingly lit up. When the output #Q41 of the logic gate 41 is at the level H, on the other hand, no electric current runs through the light-emitting diode LED1, which is accordingly kept off. The light-emitting diodes LED2 and LED3 are lit up and off in a similar manner.

Figure 3:
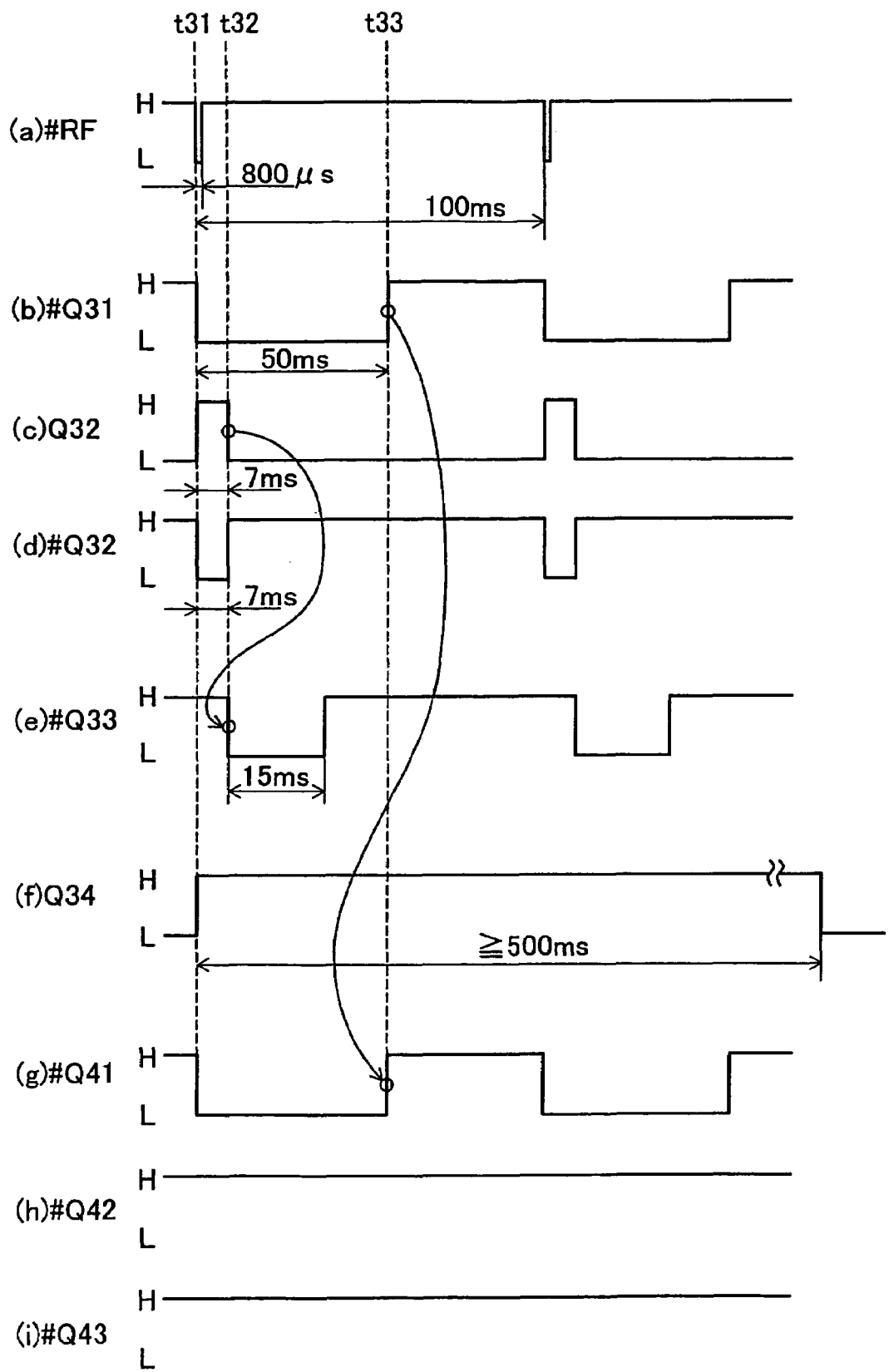
FIG. 3 is a timing chart showing the operations of the detector device to detect the radio wave transmitted from a wireless LAN device in the first embodiment of the invention.

The detector device 10 detects the radio wave transmitted from a wireless LAN device according to the operations discussed below. FIG. 3 is a timing chart showing the operations of the detector device 10 to detect the radio wave transmitted from a wireless LAN device in the first embodiment of the invention. In this example, the wireless LAN device transmits a beacon having a period of 100 ms and a pulse width of 800 μs. As shown in FIG. 3, when the wave detector circuit 22 detects the signal having the period of 100 ms and the pulse width of 800 μs, the detection output #RF falls and is kept at the level L for a time period of 800 μs.

In response to the fall of the detection output #RF, at a timing t31, the negative logic outputs #Q31 and #Q32 of the one-shot multi-vibrators 31 and 32 respectively fall and are kept at the level L for a time period of 50 ms and for a time period of 7 ms. At the same timing t31, the positive logic outputs Q32 and Q34 of the one-shot multi-vibrators 32 and 34 respectively rise and are kept at the level H for a time period of 7 ms and for a time period of 500 ms. The positive logic output Q32 of the one-shot multi-vibrator 32 falls after the time period of 7 ms at a timing t32. At the same timing t32, the negative logic output #Q33 of the one-shot multi-vibrator 33 falls and is kept at the level L for a time period of 15 ms. At a timing t33 that is 50 ms after the timing t31, the negative logic output #Q31 of the one-shot multi-vibrator 31 rises to the level H. This series of operations is repeated in response to each pulse of the detection output #RF. In the case where the detection output #RF falls again in the middle of the time period 500 ms, during which the positive logic output Q34 is kept at the level H, the level-H period of the positive logic output Q34 restarts at the moment and continues for another 500 ms.

As long as the detector device 10 receives the beacon transmitted from the wireless LAN device, the negative logic outputs #Q42 and #Q43 of the logic gates 42 and 43 are thus kept at the level H, while the negative logic output #Q41 of the logic gate 41 has the varying level between the level L and the level H. The light-emitting diode LED1 flashes on and off according to the state of the negative logic output #Q41, whereas the light-emitting diodes LED2 and LED3 are kept off.

Figure 4:
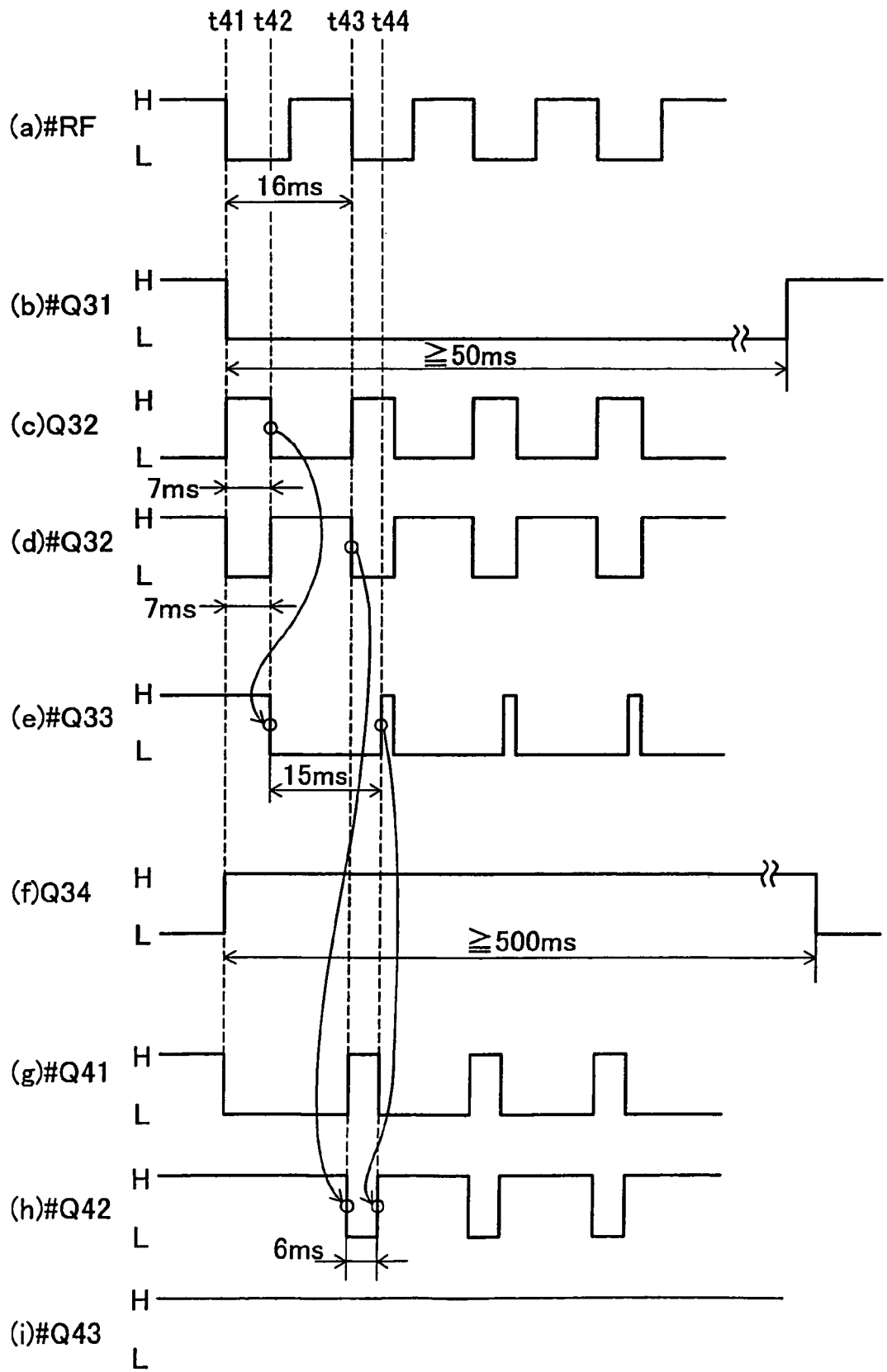
FIG. 4 is a timing chart showing the operations of the detector device to detect the radio wave transmitted from a microwave oven in the first embodiment of the invention.

The following describes the operations of the detector device 10 in the presence of the radio wave radiated from a microwave oven. FIG. 4 is a timing chart showing the operations of the detector device 10 to detect the radio wave transmitted from a microwave oven in the first embodiment of the invention. In this example, non-required radiant noise, which is a continuous pulse signal having a period of approximately 16 ms, is the radio wave radiated from the microwave oven. The non-required radiant noise is repeatedly heightened and lowered in synchronism with a power source frequency. In the region using the commercial alternating current of 60 Hz, the non-required radiant noise is a continuous pulse signal having a period of approximately $\frac{1}{60}$ ms (approximately 16 ms). When the wave detector circuit 22 detects this non-required radiant noise, the detection output #RF repeatedly varies its level between the level L and the level H at a period of approximately $\frac{1}{120}$ ms (approximately 8 ms).

In response to a first fall of the detection output #RF, at a timing t41, the negative logic outputs #Q31 and #Q32 of the one-shot multi-vibrators 31 and 32 respectively fall and are kept at the level L for a time period of 50 ms and for a time period of 7 ms. Simultaneously, the positive logic outputs Q32 and Q34 of the one-shot multi-vibrators 32 and 34 respectively rise and are kept at the level H for a time period of 7 ms and for a time period of 500 ms. At a timing t42 that is 7 ms after the timing t41, simultaneously with a fall of the positive logic output Q32 of the one-shot multi-vibrator 32, the negative logic output #Q33 of the one-shot multi-vibrator 33 falls and is kept at the level L for a time period of 15 ms. In the case where the detection output #RF falls again in the middle of the time period 50 ms, during which the negative logic output #Q31 is kept at the level L, the level-L period of the negative logic output #Q31 restarts at the moment and continues for another 50 ms. In the case where the detection output #RF falls again in the middle of the time period 500 ms, during which the positive logic output Q34 is kept at the level H, the level-H period of the positive logic output Q34 restarts at the moment and continues for another 500 ms. The positive logic output Q34 is accordingly kept at the level H, as long as the detector device 10 detects the non-required radiant noise emitted from the microwave oven.

In response to a next fall of the detection output #RF, at a timing t43 that is 16 ms after the timing t41, the negative logic output #Q32 falls again and is kept at the level L for a time period of 7 ms. At a timing t44 that is 15 ms after the timing t42, the negative logic output #Q33 rises to the level H. During a time period between the timing t43 and the timing t44, the negative logic output #Q42 of the logic gate 42 is accordingly kept at the level L.

As long as the detector device 10 receives the non-required radiant noise, which is emitted from the microwave oven as the continuous pulse signal having the period of 7 to 22 ms, the negative logic output #Q43 of the logic gate 43 is thus kept at the level H, while the negative logic outputs #Q41 and #Q42 of the logic gates 41 and 42 have the varying levels between the level L and the level H. The light-emitting diodes LED1 and LED2 are respectively lit on and off according to the state of the negative logic output #Q41 and the state of the negative logic output #Q42, whereas the light-emitting diode LED3 is kept off.

Figure 5:
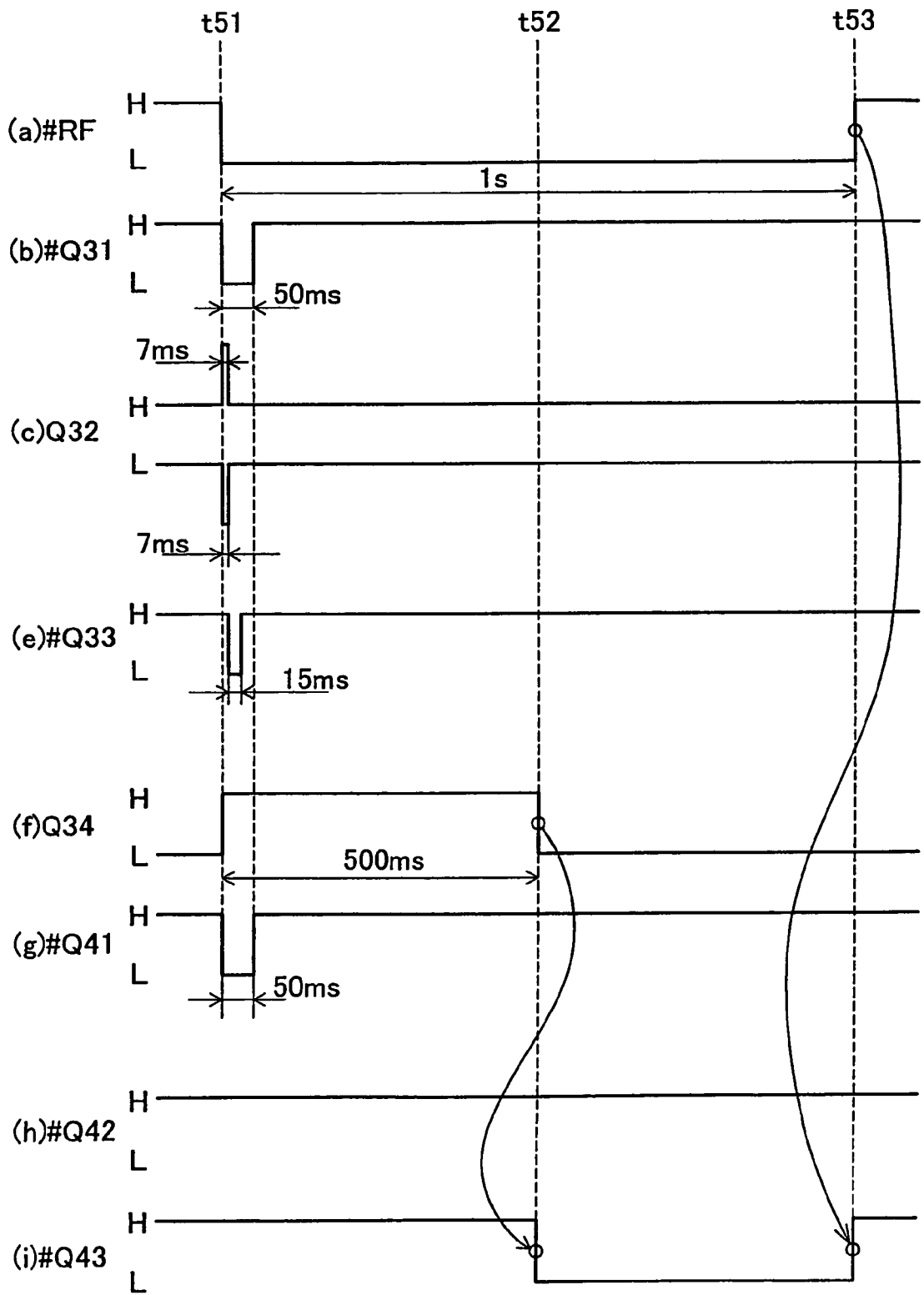
FIG. 5 is a timing chart showing the operations of the detector device to detect the radio wave transmitted from a ham radio device in the first embodiment of the invention

The following describes the operations of the detector device 10 in the presence of the radio wave transmitted from a ham radio device. FIG. 5 is a timing chart showing the operations of the detector device 10 to detect the radio wave transmitted from a ham radio device in the first embodiment of the invention. The scale on the abscissa in the timing chart of FIG. 5 is different from those on the abscissas in the timing charts of FIGS. 3 and 4. The ham radio device generally outputs the radio wave as a carrier in the course of chatting. Every time of chatting, the ham radio device, which is located in a neighborhood of the detector device 10, outputs the radio wave or the carrier in the frequency band of 2.4 GHz for at least several seconds. In the example of FIG. 5, the radio wave output from the ham radio device is a signal having a pulse width of 1 s. As shown in the timing chart of FIG. 5, while the wave detector circuit 22 detects the carrier, that is, during 1 s in this example, the detection output #RF falls and is kept at the level L for a time period of 1 s.

The profiles of the respective output signals for a time period between a timing t51 with a fall of the detection output #RF and a timing t52 with a fall of the positive logic output Q34 are identical with those for the time period between the timing t31 and the timing t33 in the timing chart of FIG. 3. A timing t53 with a rise of the detection output #RF is subsequent to the timing t52. The negative logic output #Q43 of the logic gate 43 is accordingly kept at the level L for a time period between the timing t52 and the timing t53.

As long as the detector device 10 receives the communication signal, which is transmitted from the ham radio device as the signal having the pulse width of not less than 500 ms, the negative logic output #Q42 of the logic gate 42 is thus kept at the level H, while the negative logic outputs #Q41 and #Q43 of the logic gates 41 and 43 have the varying levels between the level L and the level H. The light-emitting diodes LED1 and LED3 respectively flash on and off according to the state of the negative logic output #Q41 and the state of the negative logic output #Q43, whereas the light-emitting diode LED2 is kept off.

FIG. 6 shows the lighting statuses of the light-emitting diodes LED1, LED2, and LED3 of the display module 50 in the first embodiment of the invention. In a 'wireless LAN radio wave absent' propagation environment where the detector device 10 does not detect any radio wave in the frequency band of 2.4 GHz, all of the light-emitting diodes LED1, LED2, and LED3 are kept off. In a 'wireless LAN communicable' propagation environment where the detector device 10 detects only the radio wave transmitted from a wireless LAN device, only the light-emitting diode LED1 flashes on and off. In a 'microwave oven-causing incommunicable' propagation environment where the detector device 10 detects only the radio wave emitted from a microwave oven or the competing radio waves from the wireless LAN device and the microwave oven, the light-emitting diodes LED1 and LED2 flash on and off. In a 'ham radio device-causing incommunicable' propagation environment where the detector device 10 detects only the radio wave transmitted from a ham radio device or the competing radio waves from the wireless LAN device and the ham radio device, the light-emitting diodes LED1 and LED3 flash on and off.

In the detector device 10 of the first embodiment, the lighting statuses of the light-emitting diodes LED1, LED2, and LED3 in the display module 50 are varied according to the detected radio wave signals. When the smooth telecommunication of the wireless LAN device is interrupted, the reason of the interrupted telecommunication is identifiable by the lighting statuses of the light-emitting diodes LED1, LED2, and LED3 in the display module 50. Each of the light-emitting diodes may be lit on, instead of flashing on and off. In this modified arrangement, for example, the light-emitting diode LED1 is lit on in the 'wireless LAN incommunicable' propagation environment. The light-emitting diode LED2 is lit on in the 'microwave oven-causing incommunicable' propagation environment. The light-emitting diode LED3 is lit on in the 'ham radio device-causing incommunicable' propagation environment.

Figure 7:
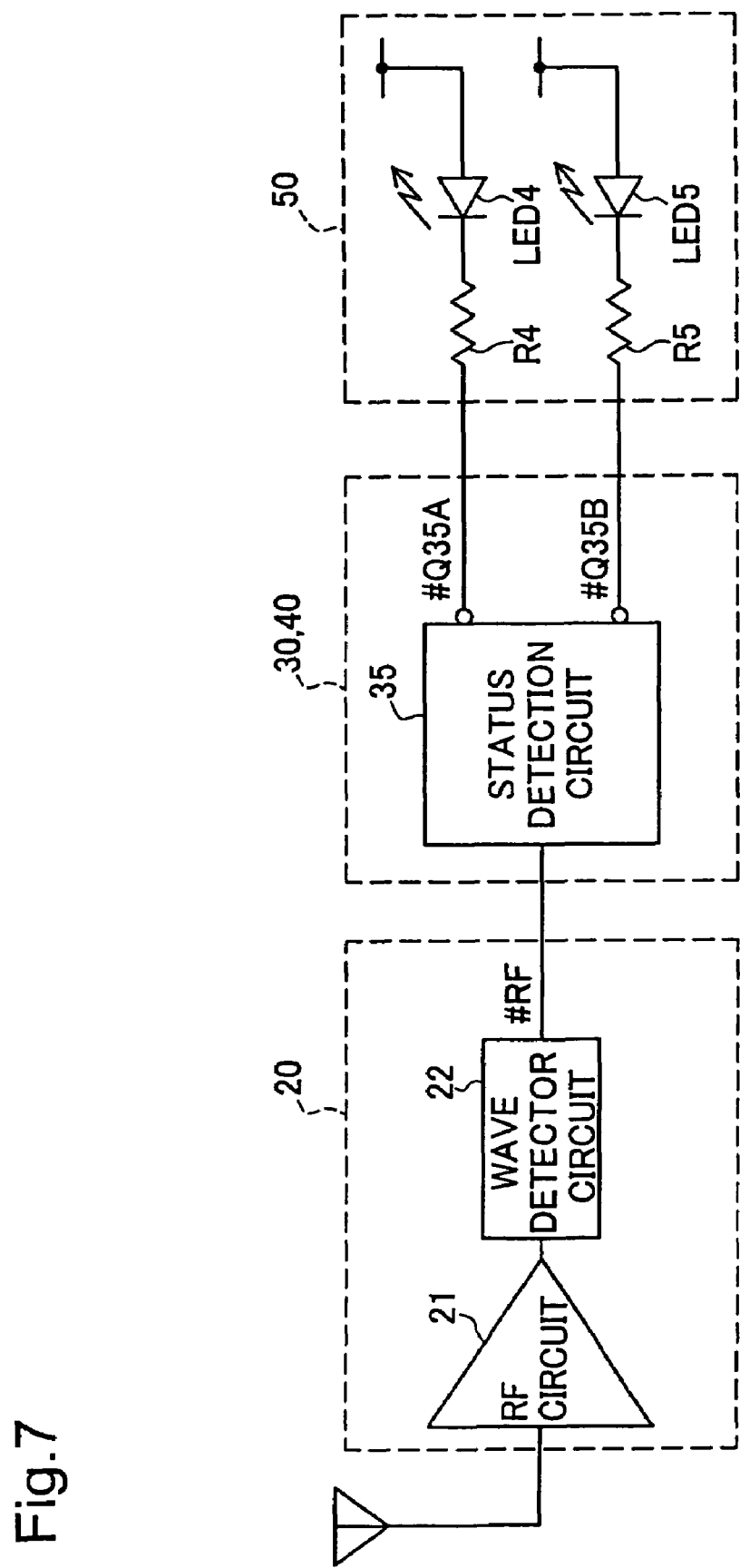
FIG. 7 is a circuit diagram showing the circuit structure of another detector device in a second embodiment of the invention.

Another detector device 100 having a different circuit structure is discussed below as a second embodiment of the present invention. The functions of the detector device 100 of the second embodiment are identical with those of the detector device 10 of the first embodiment shown in FIG. 1. FIG. 7 is a circuit diagram showing the circuit structure of the detector device 10 in the second embodiment of the invention. A wave detection module 20 included in the detector device 10 is identical with the wave detection module 20 of the first embodiment shown in FIG. 2. In the detector device 10 of the first embodiment, the functions of the extraction module 30 and the identification module 40 are actualized in the form of wired logics. In the detector device 10 of the second embodiment, on the other hand, one status detection circuit 35 executes a software program to attain the functions of both the extraction module 30 and the identification module 40. The status detection circuit 35 is a one-chip microcomputer and executes a program stored in an internal ROM or another memory (not shown) to implement extraction and identification. This program may be modified to a diversity of analyzing techniques. The status detection circuit 35 has negative logic outputs #Q35A and #Q35B. A display module 50 included in the detector device 10 has two light-emitting diodes LED4 and LED5 and two resistors R4 and R5. Level-H power lines are respectively connected to the anodes of the light-emitting diodes LED4 and LED5. The cathodes of the light-emitting diodes LED4 and LED5 are respectively linked with the negative logic output terminals #Q35A and #Q35B of the status detection circuit 35 via the resistors R4 and R5 for preventing overcurrents.

The status detection circuit 35 works as discussed below. FIG. 8 is a flowchart showing a processing routine executed by the status detection circuit 35 in the second embodiment of the invention. When the program enters the processing routine shown in FIG. 8, the status detection circuit 35 first reads the detection output #RF from the wave detector circuit 22 of the wave detection module 20 and extracts a pattern of the detection output #RF (step S810). The status detection circuit 35 subsequently determines whether or not the extracted pattern coincides with an inherent pattern of a wireless LAN device (step S820). When the extracted pattern intermittently varies at a period of not greater than 500 ms, it is determined at step S820 that the extracted pattern coincides with the inherent pattern of the wireless LAN device. The status detection circuit 35 then sets the negative logic output #Q35A to the level L and the negative logic output #Q35B to the level H (step S830). The program then exits from this processing routine. When it is determined at step S820 that the extracted pattern does not coincide with the inherent pattern of the wireless LAN device, the status detection circuit 35 further determines whether or not the extracted pattern coincides with an inherent pattern of a microwave oven or with an inherent pattern of a ham radio device (step S840). When it is determined at step S840 that the extracted pattern coincides with either a pattern of a continuous pulse at a period of 7 to 22 ms (this is intrinsic to the microwave oven) or a pattern of continuous level L state for 500 ms or longer (this is intrinsic to the ham radio device), the status detection circuit 35 sets the negative logic output #Q35A to the level H and the negative logic output #Q35B to the level L (step S850). The program then exits from this processing routine. When it is determined at step S840 that the extracted pattern does not coincide with either of these inherent patterns, the status detection circuit 35 sets both the negative logic outputs #35A and #Q35B to the level H (step S860). The program then exits from this processing routine. The status detection circuit 35 iteratively executes this series of processing at preset timings.

The pattern extraction process at step S810 is discussed more in detail. The status detection circuit 35 samples the detection output #RF in timings having a period of 200 μs, which is shorter than the pulse width (in the range of about 700 to 800 (m) of the beacon signal transmitted from the wireless LAN device. Each sampling senses the detection output #RF three consecutive times and extracts the pattern of the detection output #RF according to the more frequently sensed level. This extraction procedure desirably eliminates the noise of the detection output #RF. The period of the sampling timing and the frequency of sensing are not restricted to these values but may be set adequately by taking into account a variety of factors. The status detection circuit 35 readily implements the pattern extraction according to this procedure.

FIG. 9 is a timing chart showing the pattern extraction process of the status detection circuit 35 in the second embodiment of the invention. The status detection circuit 35 senses the detection output #RF in sampling timings (that is, timings having rises to the level H in FIG. 9) and extracts the pattern of the detection output #RF. In a first sampling timing t91, the detection output #RF is at the level L at all sensing times t911, t912, and t913. The extracted pattern is accordingly to change from the level H to the level L. Namely the status detection circuit 35 makes the negative logic output #Q35A active (at the level L). In a second sampling timing t92, the detection output #RF is at the level L at a sensing time t921 but is at the level H at sensing times t922 and t923. The status detection circuit 35 accordingly changes the extracted pattern from the level L to the level H. In a third sampling timing t93, the detection output #RF is at the level L at a sensing time t931 but is at the level L at sensing times t932 and t933. The status detection circuit 35 accordingly regards the fall of the detection output #RF to the level L as noise and keeps the extracted pattern at the level H.

The level of the negative logic output #Q35A of the status detection circuit 35 depends upon the variation of the extracted pattern. The extracted pattern at the level L results in the level L of the negative logic output #Q35A. Electric current runs through and lights up the light-emitting diode LED4, which is linked with the negative logic output #Q35A. While the negative logic output #Q35A is at the level H, no electric current runs through the light-emitting diode LED4, which is accordingly kept off. Similarly the light-emitting diode LED5 is lit on at the level L of the negative logic output #Q35B and is kept off at the level H of the negative logic output #Q35B.

When the detector device 10 does not detect the radio wave in the frequency band of 2.4 GHz, both of the light-emitting diodes LED4 and LED5 are kept off. When the detector device 10 detects the radio wave transmitted from the wireless LAN device, only the light-emitting diode LED is lit on. When the detector device 10 detects the radio wave emitted from any foreign device other than the wireless LAN device (for example, a microwave oven or a ham radio device), only the light-emitting diode LED5 is lit on.

In the detector device 10 of the second embodiment, the lighting statuses of the light-emitting diodes LED4 and LED5 in the display module 50 are varied according to the detected radio wave signals. When the smooth telecommunication of the wireless LAN device is interrupted, the reason of the interrupted telecommunication is identifiable as either of the absence of the radio wave signal or the competition with the radio wave emitted from a microwave oven or a ham radio device.

The above embodiments and their modifications are to be considered in all aspects as illustrative and not restrictive. There may be many other modifications, changes, and alterations without departing from the scope or spirit of the main characteristics of the present invention. For example, the frequency band as the detection target is not restricted to the 2.4 GHz band, which is generally used by wireless LAN devices. The detector device may be constructed to detect the radio wave in another frequency band. The pattern as the object of identification is not restricted to the inherent patterns of the microwave oven and the ham radio device, but may be inherent patterns of any other suitable devices. The detector device may identify a pattern of packet communication, instead of the pattern of the beacon signal transmitted from the wireless LAN device. The display module may adopt another means to display the results of identification, in place of the light-emitting diodes. For example, the display module may use a screen to display the results of identification in the form of characters or figures. In another example, the detector device may be provided with an interface for an external device, such as a personal computer or a speaker, and causes the results of identification to be output visually or acoustically. The functions of the detector device may be built in a wireless LAN device or any other suitable device.

The scope and spirit of the present invention are indicated by the appended claims, rather than by the foregoing description.

What is claimed is:

1. A detector device that detects a propagation environment of radio wave in a predetermined frequency band, the radio wave is used for telecommunication between a base station and a terminal device, said detector device comprising:
   a wave detection module that receives and detects the radio wave in the predetermined frequency band;
   an extraction module that extracts a pattern representing a combination of a pulse width and a pulse cycle of the detected radio wave;
   an identification module that compares the extracted pattern with inherent patterns of radio wave outputted by the base station, and thereby identifies whether the propagation environment is a communicable state by the terminal device for communicating with the base station; and
   a display module that displays a result of the identification.

2. A detector device in accordance with claim 1, wherein said identification module determines, when the pulse width and the pulse cycle of the extracted pattern is within the inherent pattern outputted by the base station, that the identified propagation environment is a communicable state by the terminal device for communicating with the base station.

3. A detector device in accordance with claim 1, wherein said identification module determines, in the case of no extraction of the pattern representing a combination of a pulse width and a pulse cycle of the detected radio wave, that the identified propagation environment is an incommunicable state by the terminal device because of absence of the radio wave outputted by the base station.

4. A detector device in accordance with claim 1, wherein said identification module determines, when either one of the pulse width and the pulse cycle of the extracted pattern is within the inherent pattern outputted by the base station, that the identified propagation environment is an incommunicable state by the terminal device because of competition with radio wave outputted by a foreign device.

5. A detector device in accordance with claim 4, wherein the foreign device includes at least one of a ham radio device and a microwave oven.

6. A detector device in accordance with claim 1, wherein the base station and the terminal device are a wireless local area network device.

7. A terminal device that is connected via radio wave in a predetermined frequency band to a wireless local area network provided by a base station, said terminal device comprising:
   a wave detection module that receives and detects the radio wave in the predetermined frequency band;

an extraction module that extracts a pattern representing a combination of a pulse width and a pulse cycle of the detected radio wave;

an identification module that compares the extracted pattern with inherent patterns of radio wave outputted by the base station, and thereby identifies whether the propagation environment is a communicable state by the terminal device for communicating with the base station; and a display module that displays a result of the identification.

8. A method of detecting a propagation environment of radio wave in a predetermined frequency band, the radio wave is used for telecommunication between a base station and a terminal device, said method comprising the steps of:

receiving and detecting the radio wave in the predetermined frequency band;

extracting a pattern representing a combination of a pulse width and a pulse cycle of the detected radio wave and;

comparing the extracted pattern with inherent patterns of radio wave outputted by the base station, and thereby identifying whether the propagation environment is a communicable state by the terminal device for communicating with the base station.

* * * * *